United States Patent Office 3,709,945
Patented Jan. 9, 1973

3,709,945
PRODUCTION OF THIODIGLYCOL
Walter Goetze, Ludwigshafen, Werner Kasper, Frankenthal, and Gerhard Klatt and Gerhard Schulz, Ludwigshafen, Germany, assignors to Badische Anilin- & Soda-Fabrik Aktiengesellschaft, Ludwigshafen (Rhine), Germany
No Drawing. Filed Mar. 16, 1970, Ser. No. 20,150
Int. Cl. C07c 149/18
U.S. Cl. 260—609 R 3 Claims

ABSTRACT OF THE DISCLOSURE

An improved process for the production of thiodiglycol by reaction of ethylene oxide and hydrogen sulfide in a molar ratio of about 2:1 in the presence of thiodiglycol as solvent at elevated temperature and at superatmospheric pressure, wherein the improvement consists in carrying out the reaction in a homogeneous phase. Thiodiglycol is used for the production of textile and dyeing auxiliaries.

---

This invention relates to a process for the production of thiodiglycol by reaction of ethylene oxide and hydrogen sulfide in the presence of thiodiglycol as solvent.

It is known from U.S. patent specification No. 2,278,090 that thiodiglycol is obtained when ethylene oxide and hydrogen sulfide are passed in gas phase into a reaction tower which has been charged with thiodiglycol, the gaseous starting materials and the thiodiglycol being passed countercurrent. The disadvantage of the process is that a high throughput is not possible because of the gas phase in the reaction medium. It is furthermore known from Japanese patent publication No. 19,738/1864 that thiodiglycol is obtained when ethylene oxide is passed into a solution of hydrogen sulfide in thiodiglycol. This method also has the disadvantage that the presence of a gas phase makes short reaction times impossible, as may be seen from the low ethylene oxide feed rate. Finally it is also known from Japanese patent publication No. 10,122/1965 that thiodiglycol is obtained when a solution of ethylene oxide in thiodiglycol is allowed to stand and is then reacted with hydrogen sulfide. This method has the disadvantage that the solution of ethylene oxide in thiodiglycol may undergo an uncontrolled reaction, polyethers being formed, while it is left to stand. All prior art methods also have the disadvantage that transfer of heat is greatly impaired by the presence of a gas phase. It is of course necessary to provide for good heat transfer because the reaction is exothermic.

An object of this invention is to provide a process in which the production of thiodiglycol proceeds rapidly while using a small reaction chamber. Another object of the invention is to provide a process in which the temperature of the reaction mixture is easy to regulate.

In accordance with this invention, these and other objects and advantages are achieved in an improved process for the production of thiodiglycol by reaction of ethylene oxide and hydrogen sulfide in a molar ratio of about 2:1 in the presence of thiodiglycol as solvent at elevated temperature and superatmospheric pressure, wherein the improvement consists in carrying out the reaction in a homogeneous phase.

Ethylene oxide and hydrogen sulfide are used in a molar ratio of about 2:1. Slight deviations from this ratio, for example of up to 10%, do not have any significant consequences. It is best however to keep as close as possible to the stated ratio.

The reaction is carried out in thiodiglycol as solvent. It is advantageous to use such an amount of thiodiglycol that from 20 to 55% by weight of thiodiglycol is contained in the reaction mixture consisting of thiodiglycol, ethylene oxide and hydrogen sulfide.

The reaction is advantageously carried out at temperatures of from 40° to 110° C. Particularly good results are obtained by using temperatures of from 60° to 80° C. It has proved to be particularly advantageous to control the course of the reaction so that it proceeds isothermally.

The reaction is preferably carried out at pressures of from 30 to 90 atmospheres. It is an essential feature of this invention that the reaction is carried out in homogeneous phase, i.e. that no gas phase forms in the reaction mixture. This is achieved by selecting a pressure which in every case is greater than the partial pressure of hydrogen sulfide at the temperature employed. It is therefore necessary at any given reaction temperature to select a pressure at which a gas phase cannot form in the reaction medium.

Residence times of from 1.5 to 5 minutes are advantageously maintained in the reaction.

The process according to the invention may be carried out for example by feeding a solution of ethylene oxide in thiodiglycol together with hydrogen sulfide into the lower end of a tubular reaction zone, good mixing being ensured by suitable equipment. The reaction proceeds inside the tubular reaction zone within a short time under the specified temperature and pressure conditions. The pressure may easily be controlled by a constant pressure valve at the upper end of the tubular reaction zone. The reaction mixture leaving the upper end of the reaction zone consists of thiodiglycol which can be used without further purification. If particularly pure thiodiglycol is to be prepared, purification by fractional distillation may be carried out if necessary.

The thiodiglycol prepared by the process according to the invention is suitable for the production of auxiliaries for the textile and dyeing industries.

The following example illustrates the invention.

EXAMPLE 19.2 kg. per hour of a mixture of 50.5% by weight of hydrogen sulfide and 49.5% by weight of bis-($\beta$-hydroxyethyl)thioether together with 24.6 kg. of ethylene oxide are fed into a coiled tube consisting of eleven tubes in a hairpin arrangement, each tube having a length of 6 meters and an internal diameter of 7 millimeters and the coiled tube having a total volume of 2545 ccm. The concentration of bis-($\beta$-hydroxyethyl)-thioether in the mixture is 21.7% by weight. The ethylene oxide and the mixture of bis-($\beta$-hydroxyethyl)-thioether and hydrogen sulfide are preheated to 80° C. in separate heat exchangers before being united and fed in through a baffle tube in which mixing is effected. A temperature of 80° C. is maintained throughout the entire reaction zone in the coiled tube by means of cooled zones. The pressure is kept at 75 atmospheres gauge by means of a constant pressure valve at the end of the coiled tube. 43.6 kg. per hour of a reaction mixture containing about 98% by weight of thiodiglycol is obtained at the end of the coiled tube. Pure thiodiglycol is isolated by fractional distillation.

We claim:

1. An improved process for the production of thiodiglycol by the reaction of ethylene oxide and hydrogen sulfide in a molar ratio of about 2:1 in the presence of from 20 to 55% by weight of thiodiglycol as a solvent, with reference to the whole of the reaction mixture, at temperatures of from 40° to 110° C. and pressures of from 30 to 90 atmospheres, wherein the improvement consists in carrying out the reaction in a homogeneous liquid phase, the pressure at the reaction temperature within said temperature range being higher than the vapor pressure of the hydrogen sulfide to thereby avoid formation of a gas phase in the reaction mixture.

2. A process as claimed in claim 1 carried out at a temperature of from 60° to 80° C.

3. A process as claimed in claim 1 carried out with a residence time of from 1.5 to 5 minutes.

References Cited

UNITED STATES PATENTS 2,278,090   3/1942   Othmer _____ 260—609 A

OTHER REFERENCES

Berbé: Bull. Soc. Chim. Belg., 59, 449–457 (1950).

LEWIS GOTTS, Primary Examiner

D. R. PHILLIPS, Assistant Examiner